US00RE47020E

(19) United States
(12) Reissued Patent
Alnås et al.

(10) Patent Number: US RE47,020 E
(45) Date of Reissued Patent: Aug. 28, 2018

(54) CERTIFICATE BASED ACCESS CONTROL IN OPEN MOBILE ALLIANCE DEVICE MANAGEMENT

(71) Applicant: Sony Mobile Communications Inc., Tokyo (JP)

(72) Inventors: Svante Alnås, Lund (SE); Stefan Andersson, Klagerup (SE)

(73) Assignee: Sony Mobile Communications Inc., Tokyo (JP)

(21) Appl. No.: 15/152,271

(22) Filed: May 11, 2016

Related U.S. Patent Documents

Reissue of:
(64) Patent No.: 8,739,258
Issued: May 27, 2014
Appl. No.: 12/969,828
Filed: Dec. 16, 2010

U.S. Applications:
(60) Provisional application No. 61/413,006, filed on Nov. 12, 2010.

(51) Int. Cl.

| | |
|---|---|
| ***G06F 7/04*** | (2006.01) |
| ***H04W 12/08*** | (2009.01) |
| ***H04L 12/24*** | (2006.01) |
| ***H04L 29/06*** | (2006.01) |

(52) U.S. Cl.
CPC ..... *H04W 12/08* (2013.01); *H04L 41/28* (2013.01); *H04L 63/0823* (2013.01)

(58) Field of Classification Search
CPC ..... H04L 41/28; H04W 12/08; G06F 7/04
See application file for complete search history.

(56) References Cited

U.S. PATENT DOCUMENTS

| | | | | |
|---|---|---|---|---|
| 6,175,878 | B1 * | 1/2001 | Seaman et al. | 719/315 |
| 8,838,754 | B1 * | 9/2014 | Rao | G06F 8/665 709/221 |
| 2006/0080534 | A1 * | 4/2006 | Yeap et al. | 713/176 |
| 2006/0236325 | A1 * | 10/2006 | Rao et al. | 719/315 |
| 2008/0098221 | A1 * | 4/2008 | Hashimoto et al. | 713/169 |

FOREIGN PATENT DOCUMENTS

WO WO2006/092642 * 8/2006 ..... H04L 29/06

OTHER PUBLICATIONS

3GPP; "Technical Specification Group Services and System Aspects; Feasibility Study on the Security Aspects of Remote Provisioning and Change of Subscription form M2M Equipment; (Release 9)", 3GPP Standard; 3GPP TR 33.812, 3rd Generation Partnership Project (3GPP), Mobile Competence Center, France, No.V1.5.0, Jul. 1, 2009, pp. 1-87, XP050380630.

(Continued)

*Primary Examiner* — Jalatee Worjloh
(74) *Attorney, Agent, or Firm* — Tucker Ellis LLP

(57) ABSTRACT

A wireless communication device provides a method of certificate-based access control. Particularly, the device establishes a secure communications session with a device management server. Rather than use access control lists to control access to the functions and services on the device, however, the device uses the certificate that was employed to establish the secure session to control access.

26 Claims, 4 Drawing Sheets

(56) References Cited

OTHER PUBLICATIONS

ITU-T, "ITU-T Rec. X.509, Information technology—Open Systems Interconnection—The Directory: Public-key and attribute certificate frameworks", Series X: Data Networks, Open System Communications and Security, No. X.509, Aug. 8, 2005, XP007913144.
Sameshima, Y., "Authorization with security attributes and privilege delegation Access control beyond the ACL", Computer Communications, Elsevier Science Publishers BV, Amsterdam, NL, vol. 20, No. 5, Jul. 1, 1997, pp. 376-384, XP004126692.
Kaijser, P., et al., "Sesame: The solution to security for open distributed systems", Computer Communications, Elsevier Science Publishers BV, Amsterdam, NL, vol. 17, No. 7, Jul. 1, 1994, pp. 501-518, XP024227374.
OMA, "OMA Device Management Tree and Description", Approved Version 1.2—Feb. 9, 2007, Open Mobile Alliance, OMA-TS-DM_TND-V1_2-20070209-A, XP-002624032.
Sony Ericsson Mobile Communications AB, "European Search Report", completed Mar. 13, 2012 in re EP Application No. EP11008138.

* cited by examiner

CERTIFICATE BASED ACCESS CONTROL IN OPEN MOBILE ALLIANCE DEVICE MANAGEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 8,739,258, issued May 27, 2014, which* claims priority from U.S. Provisional Application Ser. No. 61/413,006 entitled, "Certificate Based Access Control in Open Mobile Alliance Device Management." The '006 provisional application, which was filed Nov. 12, 2010, is incorporated herein in its entirety by reference.

FIELD OF THE INVENTION

The present invention relates generally to wireless communication devices, and more particularly to methods of controlling access to objects and functions on the wireless communication devices.

BACKGROUND

The Open Mobile Alliance (OMA) Device Management (DM) is a protocol designed to allow, for example, network operators to remotely manage mobile devices, such as cellular telephones, Personal Digital Assistants (PDAs), and palm top computing devices. With OMA DM, the network operators can perform functions such as provision the devices remotely, manage configuration settings, install and upgrade the software, and monitor and manage faults on the device.

Each device that supports OMA DM exposes a management tree that contains and organizes all available Management Objects (MOs) on the device to device management servers. A MO is an object associated with a specific functionality on the device and contains one or more nodes that support that functionality. A first MO, for example, may relate to Multimedia Messaging Service (MMS) functionality and settings on the device, while a second MO relates to email functionality on the device. A third MO may relate to the functionality associated with connectivity. Other MOs associated with other functions on the device are also possible. To manage this functionality and settings on mobile devices, network operators utilize servers that have rights to access the nodes in the MOs.

Currently, access control is handled at the node-level. Each node includes an Access Control List (ACL) identifying the servers that are allowed to manage the functions of the node. A given server can manage the function on a given node only if an associated ACL for the node identifies the server as being valid. This node-level access control provides a great deal of flexibility, but makes device management complicated. In practice, network operators generally already have full control of all the nodes on the device or for all management objects they are supporting. Further, ACLs are not very useful for multiple management authorities as ACLs only support delegation.

Another problem with existing ACL mechanisms is that each node needs an associated ACL value. However, in some platforms, there is only an Application Programming Interface (API) available to get/set the node values. As one example, the conventional implementations of ACL mechanisms do not support operations to retrieve and store connectivity settings, including ACL values, on the ANDROID platform. This is because the API to the database where the connectivity settings are stored does not contain ACL, thereby prohibiting the modification of the database. Avoiding current ACL mechanisms on this platform, as well as other platforms, will reduce complexity.

SUMMARY

The present invention provides a method of access control for management of wireless communication devices. More particularly, the present invention replaces the conventional access control based on ACLs with certificate-based access control based on the management object (MO) level. A mobile device is provisioned with one or more certificates, which may be used to establish a device management session. Each certificate is bound to one or more MOs on the device. Access control is based on the certificate used to establish the device management session. When a session is established, the server is granted access to all nodes associated with the MOs bound to the certificate. When the server attempts to manage the functions of a node within a MO, the device will grant the server access to the node only if the certificate used in the management session allows this. Thus, the certificate that is used for allowing access to an MO is the same that is used in the Hypertext Transfer Protocol Secure (HTTPS) Transport Layer Security (TLS) session for device management.

A number of methods may be used to create the binding between a certificate and one or more MOs. Each MO is identified by a unique Management Object Identifier (MOID). In general, the MOID of the management object is associated with the certificate in some manner. For example, in some embodiments, each certificate used in the management session could contain one or more MOIDs. In other embodiments, the device stores a policy table listing each certificate and corresponding MOIDs. Other methods of binding a certificate to a management object could also be used.

The use of certificates at the MO level reduces the complexity of implementing access control when compared to conventional ACL implementations. Further, there is often no support for ACL mechanisms in many Application Programmer Interfaces (APIs) for certain popular platforms, such as the ANDROID platform. Additionally, utilizing certificates for access control reduces the amount of access control information that is communicated because the certificates control access at the MO level rather than the node level.

Therefore, according to one or more embodiments, the present invention provides a method of certificate-based access control in a wireless communication device. In one embodiment, the method comprises storing a management object in a memory of a wireless communication device, the management object having a unique ID and one or more nodes associated with corresponding device management functions, establishing a secure communication session with a network server using a certificate, and controlling access to the management object by the server based on whether the certificate used to establish the communication session is valid to access the management object.

In one embodiment, the secure communication session comprises a device management session.

In one embodiment, the method further comprises binding the certificate to the management object at the wireless communication device.

In one embodiment, binding the certificate to the management object at the wireless communication device comprises placing one or more management object IDs of the management object into the certificate.

In one embodiment, binding the certificate to the management object at the wireless communication device comprises associating one or more management object IDs received in the certificate used to establish the communication session with a certificate ID of the certificate, and storing the association in the memory at the wireless communication device.

In one embodiment, the certificate used to establish the communication session includes a management object ID. In such embodiments, controlling access to the device management function further comprises comparing the management object ID received with the certificate to the management object ID of the management object stored in memory responsive to receiving the command to perform the device management function, granting access to the management object and its one or more nodes if the management object ID received with the certificate matches the management object ID of the management object, and denying access to the management object and its one or more nodes if the management object ID received with the certificate does not match the management object ID of the management object.

In one embodiment, binding the certificate to the management object at the wireless communication device comprises associating the management object ID of the management object stored in the memory with a certificate ID of the certificate used to establish the communication session, and storing the association in a binding table in the memory at the wireless communication device.

In such embodiments, controlling access to the management object comprises receiving a command to perform a device management function from the network server, comparing the certificate ID for the network server to one or more certificate IDs stored in the binding table to identify the associated management object, granting access to the management object and its one or more nodes if the certificate ID for the network server matches a certificate ID stored in the binding table, and denying access to the management object and its one or more nodes if the certificate ID for the network server does not match a certificate ID stored in the binding table.

In one embodiment, controlling access to the management object comprises granting or denying access to a node of the management object based on whether the certificate used to establish the communication session is bound to the management object.

The present invention also contemplates a wireless communication device configured to perform one or more embodiments of the present invention. In one embodiment, the wireless communication device comprises a memory to store a management object having a unique ID and one or more nodes associated with corresponding device management functions, a communications interface to communicate with a network server, and a controller. The controller is configured to establish a secure communication session with the server using a certificate, and control access to the management object by the server based on whether the certificate used to establish the communication session is valid to access the management object.

In one embodiment, the controller is further configured to bind the certificate used to establish the secure communication session to the management object stored in memory by placing one or more management object IDs of the management object into the certificate.

In one embodiment, the controller is further configured to bind the certificate used to establish the secure communication session to the management object stored in memory by associating one or more management object IDs included in the certificate used to establish the communication session with a certificate ID of the certificate, and storing the association in the memory at the wireless communication device.

In one embodiment, the controller is further configured to control access to the management object by comparing a management ID received with the certificate to the management object ID of the management object stored in the memory, granting access to the management object and its one or more nodes if the management object ID received with the certificate matches the management object ID of the management object, and denying access to the management object and its one or more nodes the management object ID received with the certificate does not match the management object ID of the management object.

In one embodiment, the controller is further configured to bind the certificate used to establish the secure communication session to the management object stored in memory by associating the management object ID of the management object stored in the memory with a certificate ID of the certificate used to establish the communication session, and storing the association in a binding table in the memory at the wireless communication device.

In such embodiments, the controller is configured to control access to the management object by the server by comparing the certificate ID of the received certificate to one or more certificate IDs stored in the binding table at the wireless communication device to identify a corresponding management object, granting access to the corresponding management object and its one or more nodes if the certificate ID of the received certificate matches a certificate ID stored in the binding table, and denying access to the corresponding management object and its one or more nodes if the certificate ID of the received certificate does not match a certificate ID stored in the binding table.

In one embodiment, the controller is further configured to grant or deny access to the management object and its corresponding nodes based on whether the certificate used to establish the communication session is bound to the management object.

In one embodiment, the device management functions comprise protected functions at the wireless communication device.

Of course, the present invention is not limited to the above features and advantages. Indeed, those skilled in the art will recognize additional features and advantages upon reading the following detailed description, and upon viewing the accompanying drawings.

DETAILED DESCRIPTION

The present invention provides a method of access control in wireless communication devices that replaces the conventional ACL-based access control mechanisms that were used in OMA DM. Specifically, the present invention employs the certificates that are used in a secure communications session with a server to control access to the nodes of an MO at the MO level. This reduces the complexity of implementing access control, reduces the amount of information and signaling needed to implement access control, and provides a simpler solution to performing functions and actions on certain platforms that is not currently available using conventional ACL-based access control protocols.

Figure 1:
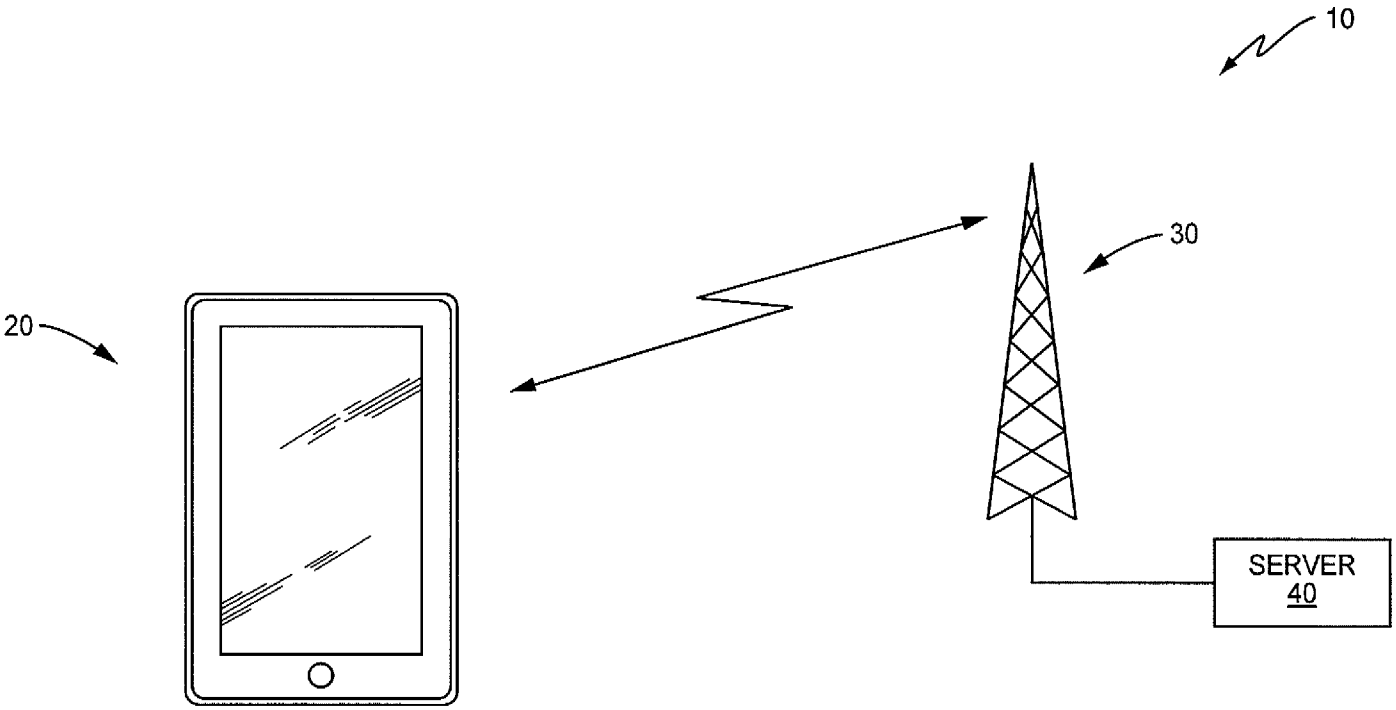
FIG. 1 is a block diagram illustrating some of the component parts of a communications system operating according to one embodiment of the present invention.

FIG. 1 illustrates an exemplary system suitable for use in one embodiment of the present invention. As seen in FIG. 1, a communications system 10 comprises a wireless communications device 20 communicating data and information over an air interface with a Base Station (BS) 30. Those skilled in the art will appreciate that the representation of the device 20 as a cellular telephone is for illustrative purposes only, and that communications between the device 20 and the BS 30 may be in accordance with any well-known protocol.

System 10 also includes a DM server 40 that communicates with device 20 via the BS 30. The server 40 may comprise, for example, one or more computing devices associated with a manufacturer of the device 20 or an operator of the communications network to which BS 30 belongs. Generally, server 40 communicates data packets to the BS 30 utilizing well-known methods and protocols (e.g. Internet protocols). The packets may comprise messages, for example, that are bound for the device 20 to control or update some function on device 20. Upon receipt of the packets, the BS 30 transmits them to device 20. In the reverse direction, packets generated at device 20 are sent to the BS 30, which are then passed to the server 40. The particular messages and protocols used to facilitate the communications between the device 20 and server 30 are well-known in the art and not germane to the present invention. Therefore, they are not discussed in detail here.

Server 40 may be associated with a manufacturer of the device or with an operator of the network in which BS 30 operates. In one embodiment, server 40 is a DM server that functions to manage the device 20. As is known in the art, DM allows a manufacturer or network operator, for example, to control certain functions and settings on a device 20 without requiring the user of the device 20 to come to a maintenance center. For example, a manufacturer may utilize a DM server 40 to bootstrap provision device 20, to remotely maintain the device 20, to report/collect configuration data from device 20, and to perform diagnostics and/or fault management on device 20. Additionally, a manufacturer or network operator may want to evolve the functionality of device 20 to include a richer feature set, or to install, update, and manage the software resident on device 20.

Figure 2:
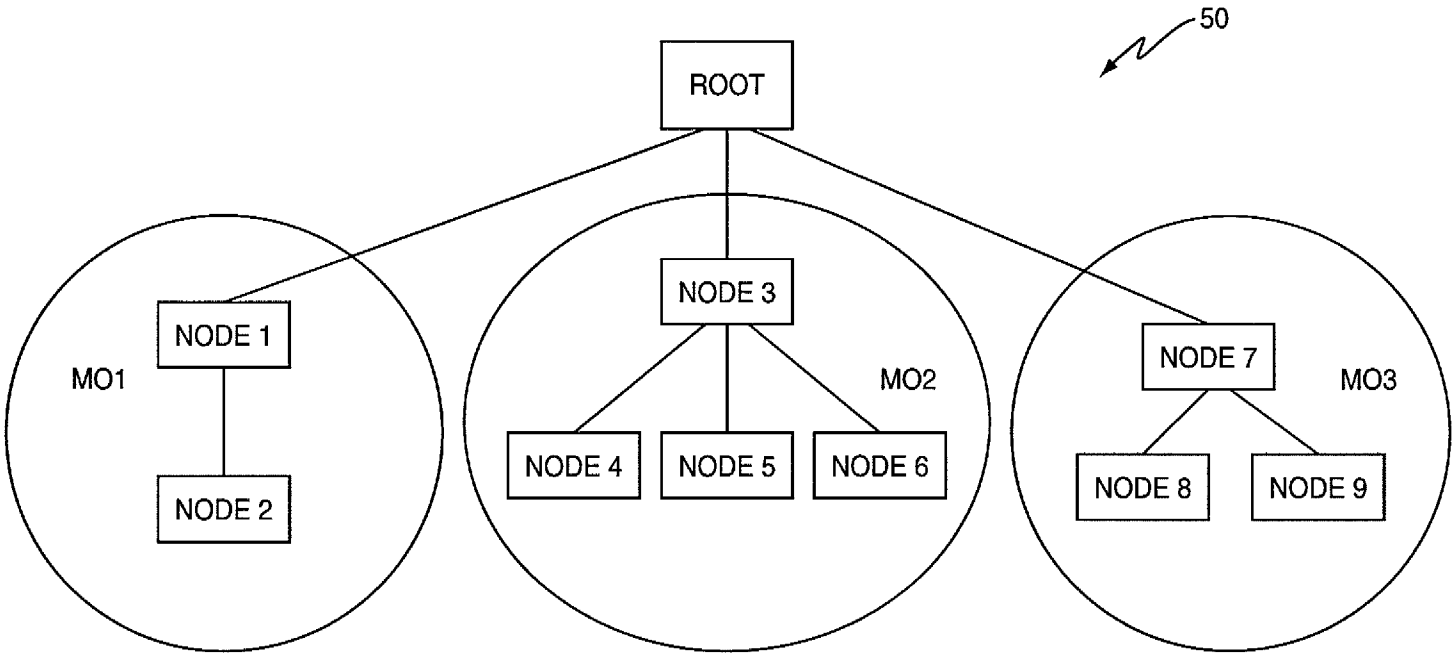
FIG. 2 is a block diagram illustrating a Management Object tree along with its nodes.

As previously stated, the OMA DM is a device management protocol that defines how server 40 can manage device 20 remotely. Each device 20 that supports OMA DM exposes its functionality in a management tree 50 (FIG. 2) that contains and organizes all available MOs on the device 20. In FIG. 2, the management tree 50 contains a root node and three different MOs labeled MO1, MO2, and MO3. Each MO contains a set of one or more nodes labeled, respectively, NODE1-NODE9.

Each MO is associated with a different functionality. For example, MO1 and its associated nodes, NODE1 and NODE2, may be associated with MMS functionality. MO2 and its nodes, NODE3-NODE6, may be associated with e-mail functionality on the device 20. Finally, MO3 and its nodes, NODE7-NODE9, may be associated with connectivity of device 20. Those skilled in the art should appreciate that these MOs and their stated functions are illustrative only. There may be other MOs that contain other nodes associated with other functionality and settings.

The nodes, NODE1-NODE9, are entities that can be manipulated by the server 40 via the OMA DM protocol. Each node has a set of run-time properties associated with it that are valid only for that node. The MOs allow access to their respective nodes directly via a unique Uniform Resource Indicator (URI). Thus, a server 40 could access a particular node 60 by providing the correct URI to the device 20. For example, to access NODE9, the URI would be ./NODE7/NODE9.

The current OMA DM specification provides access control at the node level using Access Control Lists (ACLs). Particularly, each node includes an ACL that identifies which servers 40 can access the functions of the node. Access control at the node level, however, is not very practical and not in widespread use. The present invention replaces node-level ACLs with certificates that are bound to the MOs in the management tree. According to embodiments of the present invention, access control is based on the certificates used to establish a secure communications session between device 20 and server 40.

Figure 3:
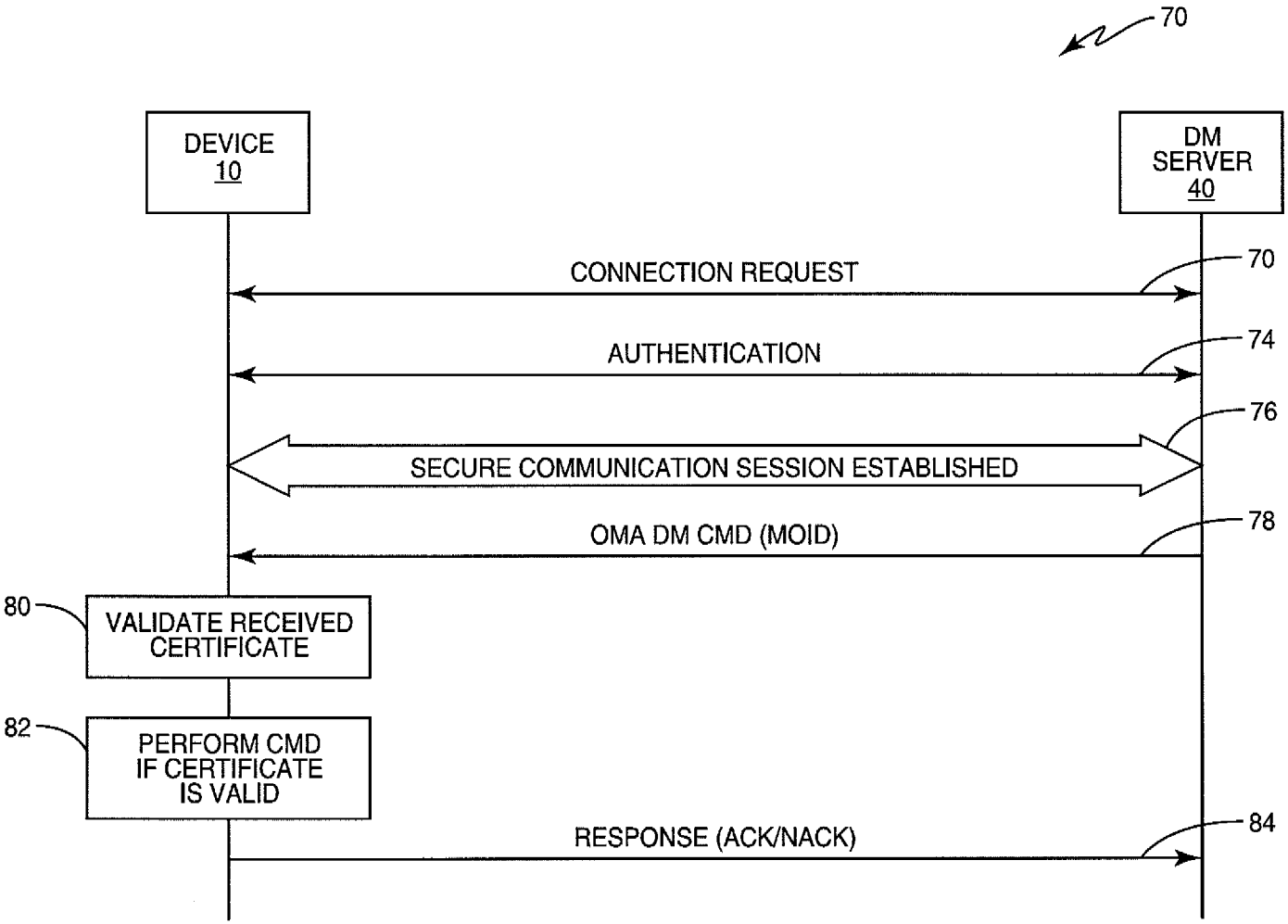
FIG. 3 is a signaling diagram illustrating how a DM server manages the wireless communication device according to one embodiment of the present invention.

FIG. 3 is a signal diagram 70 illustrating how a device 20 may be managed by DM server 40 according to one embodiment of the present invention. As seen in FIG. 3, server 40 begins by sending a connection request to establish a secure communications session to device 20 (line 72). Alternatively, the connection request may originate from the device 20. Once received, the device 20 will initiate a TCP connection to the server 40 and the device 20 and server 40 will authenticate each other (line 74). During the authentication procedure, the device 20 and the server 40 negotiate the certificate that is used in the management session. Once authenticated, a secure communications channel is established between the device 20 and the server 40 to allow for the communication of signals and data packets (line 76).

The certificate that is used to establish the device management session will be used to control access to the MOs and their respective nodes. At some point, during the management session, the DM server 40 may send a command to device 20 to perform some management function (line 78). The command sent by the server 40 may include an MOID identifying a particular MO to which access is required, or may address a particular node in the device management tree. The managed device will validate the command depending on the certificate used in the session (box 80). That is, commands directed to nodes of management objects bound to the certificate for the session will be allowed. When the command is valid, the device 20 will perform the requested action (box 82) and send an acknowledgement response (e.g., ACK) (line 84) to the server 40. If the command is not valid, the device 20 will not perform the requested action. In this case, the response will comprise a negative acknowledgement (e.g., NACK) (line 84).

The binding between a certificate and one or more MOs may be created in different ways. As previously noted, each MO is identified by a unique Management Object Identifier (MOID). In some embodiments, the certificate itself contains a list of MOIDs. In this case, the server is granted access to nodes of any management object in the certificate's MO list. However, that embodiment would require the generation and dissemination of new certificates each time a new MO was added or an existing MO was changed. In another, more flexible embodiment, the device 20 maintains a table or list of valid MOIDs referred to herein as a "policy table." The MOIDs in the policy table associate the certificates with corresponding MOIDs. For example, the policy table or "binding" table may comprise a table listing the device's local certificate IDs and corresponding list of MOIDs for each certificate. In this case, the server 40 is granted access to nodes of the management objects listed in the binding table.

Figure 4:
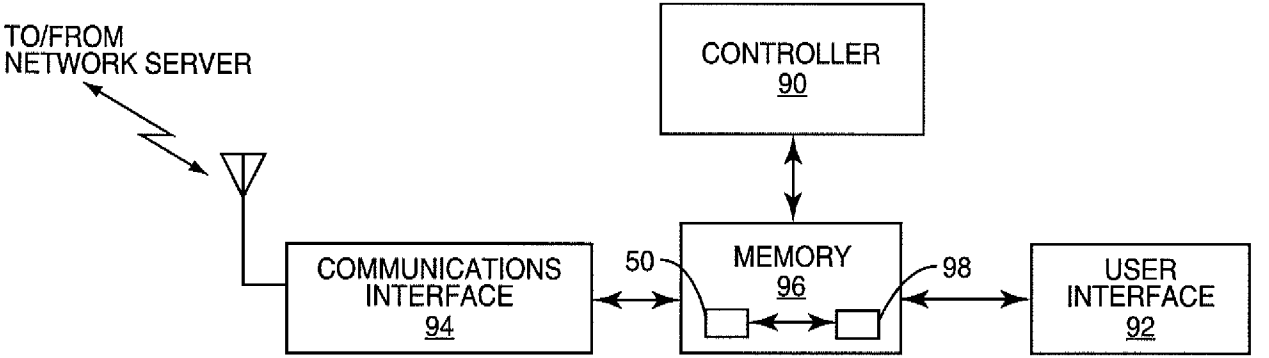
FIG. 4 is a block diagram illustrating some of the components of a wireless communication device configured according to one embodiment of the present invention.

FIG. 4 is a block diagram illustrating some of the components of a wireless communication device configured according to one embodiment of the present invention. As seen in FIG. 4, the wireless communication device 20 comprises a programmable controller 90, a User I/O Interface 92, a communications interface 94, and a memory 96. The programmable controller 90 is generally responsible for controlling the functions and overall operation of the device 20 according to program instructions and data stored in memory 96. Controller 90, which may be implemented in hardware, firmware, software, or a combination thereof, and may comprise a single microprocessor or multiple microprocessors, and may be general purpose microprocessors, digital signal processors, or other special purpose processors. According to embodiments of the present invention, the programmable controller 90 is programmed to establish secure communications sessions with the network server 30, and to control access to the management object tree 50 by the server. In one embodiment, for example, the controller 90 is programmed to either grant or deny access to the management object 50 and its nodes based on whether the certificate used to establish the communication session is valid for accessing the management object.

The User I/O Interface 92 allows a user to interact with device 20. Some of the components that may be included in the User I/O Interface 92 area display, a keyboard or keypad, a microphone, and a speaker. The communication interface 94 allows the device 20 to establish secure communication sessions with the network server 30, and to communicate messages and other data with the network server 40 according to any known protocol. In one embodiment, where the device 20 is embodied as a personal computer or tablet computer, the communication interface 94 comprises a hardware port such as an Ethernet port, for example, or wireless interface, such as a wireless LAN (802.11x) interface. In other embodiments, such as when device 20 comprises a cellular telephone or other mobile communication device, the communication interface 94 comprises a fully functional cellular radio transceiver that can operate according to any known standard, including the standards known generally as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), and Worldwide Interoperability for Microwave Access (WiMAX).

Memory 96 comprises a computer-readable medium that may include both random access memory (RAM) and read-only memory (ROM). Those skilled in the art will appreciate that the memory 96 may also be embodied as other tangible components, such as compact disks (CDs), hard drives, tapes, and digital video disks (DVDs) that may be integrated with or connected to the device 20 via an interface port (not shown). The computer program instructions and data required for operation of device 20 are stored in non-volatile memory, such as EPROM, EEPROM, and/or flash memory, which may be implemented as discrete devices, stacked devices, or integrated with the controller 90. Additionally, according to one or more embodiments of the present invention, memory 20 stores the management object tree 50 and a policy table 90, as previously described.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of certificate-based access control in a wireless communication device, the method comprising:

storing a management object in a memory of a wireless communication device, the management object having a [unique] *first management object* ID and one or more nodes associated with corresponding device management functions;

establishing a secure communication session with a network server using a certificate;

*receiving one or more requested management object IDs in the certificate;* and binding the certificate to the management object at the wireless communication device, wherein the binding the certificate comprises:

associating *the* one or more *requested* management object IDs received in the certificate used to establish the communication session with a certificate ID of the certificate; and storing the association in the memory at the wireless communication device;

controlling access to the management object by the server based on whether the certificate used to establish the communication session is valid to access the management object.

[2. The method of claim 1 wherein the secure communication session comprises a device management session.]

3. The method of claim 1 wherein binding the certificate to the management object at the wireless communication device comprises placing the [one or more] *first* management object [IDs] *ID* of the management object into the certificate.

4. The method of claim 1 wherein controlling access to the device management function further comprises:

comparing a *requested* management object ID received with the certificate to the *first* management object ID of the management object stored in the memory responsive to receiving the command to perform the device management function;

granting access to the management object and its one or more nodes if the *requested* management object ID received with the certificate matches the *first* management object ID of the management object; and denying access to the management object and its one or more nodes if the *requested* management object ID received with the certificate does not match the *first* management object ID of the management object.

5. The method of claim 1 wherein binding the certificate to the management object at the wireless communication device comprises:

associating the *first* management object ID of the management object stored in the memory with a certificate ID of the certificate used to establish the communication session; and storing the association in a binding table in the memory at the wireless communication device.

6. The method of claim 5 wherein controlling access to the management object comprises:

receiving a command to perform a device management function from the network server;

comparing the certificate ID for the network server to one or more certificate IDs stored in the binding table to identify the associated management object;

granting access to the management object and its one or more nodes if the certificate ID for the network server matches a certificate ID stored in the binding table; and denying access to the management object and its one or more nodes if the certificate ID for the network server does not match a certificate ID stored in the binding table.

7. The method of claim 1 wherein controlling access to the management object comprises granting or denying access to a node of the management object based on whether the certificate used to establish the communication session is bound to the management object.

8. A wireless communication device comprising:

a memory to store a management object having a [unique] *first management object* ID and one or more nodes associated with corresponding device management functions;

a communications interface to communicate with a network server; and a [controller] *processor* configured to:

establish a secure communication session with the server using a certificate, *wherein the certificate includes one or more requested management object IDs*;

bind the certificate used to establish the secure communication session to the management object stored in memory by:

associating *the* one or more *requested* management object IDs included in the certificate used to establish the communication session with a certificate ID of the certificate and storing the association in the memory at the wireless communication device and control access to the management object by the server based on whether the certificate used to establish the communication session is valid to access the management object.

9. The device of claim 8 wherein the [controller] *processor* is further configured to bind the certificate used to establish the secure communication session to the management object stored in memory by placing [a] *the first* management object ID of the management object into the certificate.

10. The device of claim 8 wherein the [controller] *processor* is [further] configured to control access to the management object by:

comparing [a] *the one or more requested* management [ID received with] *object IDs included in* the certificate to the *first* management object ID of the management object stored in the memory;

granting access to the management object and its one or more nodes if the *one or more requested* management object [ID received with] *IDs included in* the certificate matches the *first* management object ID of the management object; and denying access to the management object and its one or more nodes the *if the one or more requested* management object [ID received with] *IDs included in* the certificate does not match the *first* management object ID of the management object.

11. The device of claim 8 wherein the [controller] *processor* is further configured to bind the certificate used to establish the secure communication session to the management object stored in memory by:

associating the *first* management object ID of the management object stored in the memory with a certificate ID of the certificate used to establish the communication session; and storing the association in a binding table in the memory at the wireless communication device.

12. The device of claim 11 wherein the [controller] *processor* is configured to control access to the management object by the server by:

comparing the certificate ID of the [received] certificate to one or more certificate IDs stored in the binding table at the wireless communication device to identify a corresponding management object;

granting access to the corresponding management object and its one or more nodes if the certificate ID of the [received] certificate matches a certificate ID stored in the binding table; and denying access to the corresponding management object and its one or more nodes if the certificate ID of the [received] certificate does not match a certificate ID stored in the binding table.

13. The device of claim 8 wherein the [controller] *processor* is further configured to grant or deny access to the management object and its corresponding nodes based on whether the certificate used to establish the communication session is bound to the management object.

[14. The device of claim 8 wherein the device management functions comprise protected functions at the wireless communication device.]

*15. A method of certificate-based access control for a wireless communication device comprising a memory, the method comprising:*

*storing a management object in the memory of the wireless communication device, the management object including a first management object ID and at least one node that implements a device management function;*

*establishing a secure communication session with a network server using a certificate, the certificate including a certificate ID;*

*receiving one or more requested management object IDs with the certificate;*

*binding the certificate to the management object at the wireless communication device, wherein the binding the certificate comprises associating the one or more requested management object IDs received with the certificate used to establish the communication session with the certificate ID of the certificate and storing the association at the wireless communication device;*

*receiving from the server a management object controller command to manage the management object stored in the wireless communication device; and*

*controlling access to the management object by the server based on whether the certificate received with the*

*management object controller command is or was bound to the management object.*

*16. The method of claim 15 further comprising receiving the management object controller command during the secure communication session with the server.*

*17. The method of claim 15 wherein establishing the secure communication session with the network server comprises using the certificate and establishing a Hypertext Transfer Protocol Secure (HTTPS) Transport Layer Security (TLS) session for device management.*

*18. The method of claim 15 wherein establishing the secure communication session with the network server using the certificate comprises performing a mutual authentication with the server.*

*19. The method of claim 15 further comprising accepting the certificate from the server prior to allowing access to the management object by the server.*

*20. The method of claim 15 further comprising controlling access by the server to a second management object stored at the wireless communication device based on whether the certificate is or was bound to the second management object.*

*21. The method of claim 15 further comprising validating the certificate and performing the specific device management function and sending an acknowledgement response to the server.*

*22. The method of claim 15 further comprising the server accessing and invoking the management object in response to the certificate being previously associated with the management object.*

*23. The method of claim 15 further comprising preventing the server from accessing the management object when the certificate was not previously bound with the management object.*

*24. The method of claim 15 wherein controlling access to the device management function further comprises:*

*comparing at least one of the requested management object IDs received with the certificate to the first management object ID of the management object stored in the memory responsive to receiving the management object controller command; and*

*granting access to the management object and the at least one node if the at least one requested management object ID received with the certificate matches the first management object ID of the management object.*

*25. A wireless communication device comprising:*

*a memory to store a management object including a first management object ID and one at least one node that implements a corresponding device management function;*

*a communications interface circuit to communicate with a network server; and*

*a processor configured to:*

*establish a secure communication session with the network server using a certificate, the certificate including a certificate ID;*

*receive one or more requested management object IDs with the certificate;*

*bind the certificate to the management object at the wireless communication device by associating the one or more requested management object IDs received with the certificate used to establish the communication session with the certificate ID of the certificate and storing the association at the wireless communication device;*

*receive from the server a management object controller command to manage the management object stored in the wireless communication device; and*

*control access to the management object by the server based on whether the certificate received with the management object controller command is or was bound to the management object.*

*26. The device of claim 25 wherein the processor is further configured to control access to the management object by:*

*comparing at least one of the requested management object IDs received with the certificate to the first management object ID of the management object stored in the memory; and*

*granting access to the management object and the at least one node if the at least one requested management object ID received with the certificate matches the first management object ID of the management object.*

*27. A method of certificate-based access control in a wireless communication device comprising a memory, the method comprising:*

*storing a management object in the memory of the wireless communication device, the management object including a first management object ID and at least one node that implements a device management function;*

*establishing a secure communication session with a network server using a certificate, the certificate including a certificate ID;*

*receiving one or more requested management object IDs with the certificate;*

*binding the certificate to the management object at the wireless communication device, wherein the binding the certificate comprises associating the one or more requested management object IDs received with the certificate used to establish the communication session with the certificate ID of the certificate;*

*storing the association in the memory at the wireless communication device; and*

*controlling, by the wireless device, access to the management object by the server by comparing the one or more requested management object IDs received with the certificate to the first management object ID of the management object, and granting access to the management object if one of the management object IDs received with the certificate matches the management object ID of the management object.*

*28. A wireless communication device comprising:*

*a memory to store a management object having a first management object ID and at least one node that implements a device management function;*

*a communications interface circuit configured to communicate with a network server; and*

*a processor configured to:*

*establish a secure communication session with the network server using a certificate, the certificate including a certificate ID;*

*receive one or more requested management object IDs with the certificate;*

*bind the certificate to the management object at the wireless communication device by associating the one or more requested management object IDs received with the certificate used to establish the communication session with a certificate ID of the certificate, and storing the association in the memory; and*

*control access to the management object by the server by comparing the one or more requested management object IDs received with the certificate to the first management object ID of the management object and granting access to the management object*

*if one of the requested management object IDs received with the certificate matches the first management object ID of the management object.*

* * * * *